US009695317B2

(12) United States Patent
Corun

(10) Patent No.: US 9,695,317 B2
(45) Date of Patent: Jul. 4, 2017

(54) FUEL-RESISTANT LIQUID ASPHALT BINDERS AND METHODS OF MAKING THE SAME

(71) Applicant: Associated Asphalt Marketing, LLC, Roanoke, VA (US)

(72) Inventor: Ronald Corun, Ocean City, MD (US)

(73) Assignee: Associated Asphalt Marketing, LLC, Roanoke, VA (US)

( * ) Notice: Subject to any disclaimer, the term of this patent is extended or adjusted under 35 U.S.C. 154(b) by 263 days.

(21) Appl. No.: 14/515,202

(22) Filed: Oct. 15, 2014

(65) Prior Publication Data

US 2016/0108241 A1 Apr. 21, 2016

(51) Int. Cl.
*C08L 95/00* (2006.01)
*C08K 5/17* (2006.01)
*C08J 3/20* (2006.01)
*C08J 3/24* (2006.01)

(52) U.S. Cl.
CPC ............... *C08L 95/00* (2013.01); *C08J 3/203* (2013.01); *C08J 3/24* (2013.01); *C08K 5/17* (2013.01); *C08J 2395/00* (2013.01); *C08J 2409/06* (2013.01)

(58) Field of Classification Search
CPC .................................. C08K 5/17; C08L 95/00
See application file for complete search history.

(56) References Cited

U.S. PATENT DOCUMENTS

| | | | |
|---|---|---|---|
| 4,243,568 A | 1/1981 | Brown | |
| 4,383,864 A | 5/1983 | Trujillo | |
| 4,404,311 A | 9/1983 | Mathis et al. | |
| 5,010,129 A | 4/1991 | Elias et al. | |
| 5,618,862 A * | 4/1997 | Germanaud | C08K 3/06 524/59 |
| 5,749,953 A | 5/1998 | Doyle | |
| 5,773,496 A | 6/1998 | Grubba | |
| 5,990,206 A | 11/1999 | Tanaka et al. | |
| 6,031,029 A | 2/2000 | Baumgardner et al. | |
| 6,057,390 A | 5/2000 | Loza et al. | |
| 6,087,420 A * | 7/2000 | Planche | C08K 3/06 427/138 |
| 6,100,317 A | 8/2000 | Liang et al. | |
| 6,586,080 B1 | 7/2003 | Heifetz | |
| 6,743,839 B2 | 6/2004 | Colvin et al. | |
| 6,767,939 B2 | 7/2004 | Butler et al. | |
| 6,830,408 B1 | 12/2004 | Blankenship et al. | |
| 6,927,245 B2 | 8/2005 | Buras et al. | |
| 6,982,291 B2 | 1/2006 | Desin | |
| 2009/0182074 A1 | 7/2009 | Scholten | |
| 2013/0319289 A1 | 12/2013 | Nevin | |

FOREIGN PATENT DOCUMENTS

EP 0 340 210 B1 11/1993

OTHER PUBLICATIONS

Notification of Transmittal of the International Search Report and the Written Opinion of the International Searching Authority, or the Declaration, directed to International Appl. No. PCT/US2015/054946, mailed Dec. 28, 2015, 6 pages.
"Section 7.2. Short-Term Conditioning for Mixture Mechanical Property Testing," *Standard Specifications for Transportation Materials and Methods of Sampling and Testing*, 34th Edition, American Association of State Highway and Transportation Officials, Washington, D.C., pp. R 30-2 through R 30-3 (2014).
"Determining Rutting Susceptibility of Hot Mix Asphalt (HMA) Using the Asphalt Pavement Analyzer (APA)," AASHTO Designation: T 340-10, *Standard Specifications for Transportation Materials and Methods of Sampling and Testing*, 34th Edition, American Association of State Highway and Transportation Officials, Washington, D.C., pp. T 340-1 through T 340-13 (2014).
"Determining the Fatigue Life of Compacted Asphalt Mixtures Subjected to Repeated Flexural Bending," AASHTO Designation: T 321-14, *Standard Specifications for Transportation Materials and Methods of Sampling and Testing*, 34th Edition (1994), American Association of State Highway and Transportation Officials, Washington, D.C., pp. T 321-1 through T 321-11 (2014).
"Hamburg Wheel-Track Testing of Compacted Hot Mix Asphalt (HMA)," AASHTO Designation: T 324-14, *Standard Specifications for Transportation Materials and Methods of Sampling and Testing*, 34th Edition, American Association of State Highway and Transportation Officials, Washington, D.C., pp. T 324-1 through T 324-10 (2014).
"Determining the Dynamic Modulus and Flow Number for Asphalt Mixtures Using the Asphalt Mixture Performance Tester (AMPT)," AASHTO Designation: TP 79-13, *AASHTO Provisional Standards*, 18th Edition, American Association of State Highway and Transportation Officials, Washington, D.C., pp. TP 79-1 through TP 79-19 (Jun. 2014).
"Standard Test Method for Softening Point of Bitumen (Ring-and-Ball Apparatus)," *ASTM Standards on Disc, Standards Worldwide: Road and Paving Materials; Vehicle Pavement Systems*, vol. 04.03, Designation D36-06, ASTM International, pp. 1-6 (Jun. 2012).
"Standard Test Method for Drop Melting Point of Petroleum Wax, Including Petrolatum," *ASTM Standards on Disc, Standards Worldwide: Road and Paving Materials; Vehicle Pavement Systems*, vol. 04.03, Designation D127-08, ASTM International, pp. 1-3 (Jun. 2012).
"Standard Test Methods for Analysis of Lubricating Grease," *ASTM Standards on Disc, Standards Worldwide: Road and Paving Materials; Vehicle Pavement System*, vol. 04.03, Designation D128-98, ASTM International, pp. 1-15 (Jun. 2012).

(Continued)

*Primary Examiner* — Peter D Mulcahy
(74) *Attorney, Agent, or Firm* — Charles S. Sara; DeWitt Ross & Stevens, S.C.

(57) ABSTRACT

A fuel-resistant liquid asphalt binder including a composition of fatty amine derivatives for improving the flowability and workability of a bituminous asphalt mix. The fuel-resistant liquid asphalt binder may include 0.4 wt % to 0.7 wt % of a composition of fatty amine derivatives, 2 wt % to 5 wt % styrene-butadiene-styrene, and 2 wt % to 5 wt % high acetate content ethyl vinyl acetate. The fuel-resistant liquid asphalt binder may be mixed with an aggregate to form a bituminous asphalt mix at temperatures ranging from 330° F. to 280° F.

16 Claims, 5 Drawing Sheets

(56) References Cited

OTHER PUBLICATIONS

"Standard Test Method for Theoretical Maximum Specific Gravity and Density of Bituminous Paving Mixtures," *ASTM Standards on Disc, Standards Worldwide: Road and Paving Materials; Vehicle Pavement Systems*, vol. 04.03, Designation D2041/D2041M-11, ASTM International, pp. 1-4 (Jun. 2012).

"Standard Test Method for Elastic Recovery of Bituminous Materials by Ductilometer," *ASTM Standards on Disc, Standards Worldwide: Road and Paving Materials; Vehicle Pavement Systems*, vol. 04.03, Designation D6084-06, ASTM International, pp. 1-5 (Jun. 2012).

"Standard Practice for Determining the Separation Tendency of Polymer from Polymer Modified Asphalt," *ASTM Standards on Disc, Standards Worldwide: Road and Paving Materials; Vehicle Pavement Systems*, vol. 04.03, Designation D7173-11, ASTM International, pp. 1-2 (Jun. 2012).

Evotherm® M1 Warm Mix Asphalt Additive Product Data Bulletin, MeadWestvaco Corp., revised Nov. 30, 2010, 3 pages.

Advisory Circular on Standards for Specifying Construction of Airports, U.S. Department of Transportation and Federal Aviation Administration, Washington, D.C., dated Jul. 21, 2014, 662 pages.

"A Mix Design Manual for Hot Mix Asphalt," Transportation Research Board of the National Academies, Abstract accessed at http://apps.trb.org/cmsfeed/TRBNetProjectDisplay.asp?ProjectID=967, accessed on Oct. 9, 2014, 1 page.

"A Manual for Design of Hot Mix Asphalt with Commentary," *NCHRP Report 673*, Transportation Research Board of the National Academies, 285 pages (2011).

"Test Procedure for Overlay Test," TxDot Designation: Tex-248-F, Texas Department of Transportation, effective date: Feb. 2014, pp. 1-8.

Evotherm™ M1 Material Safety Data Sheet version 3, MeadWestvaco Corp., validated Jul. 22, 2011, 8 pages.

Office Action issued in U.S. Appl. No. 11/356,543, dated Sep. 18, 2008, 16 pages.

Zhou, F., S. Hu, and T. Scullion, "Development and Verification of the Overlay Tester Based Fatigue Cracking Prediction Approach," FHWA/TX-07/9-1502-01-8, 90 pages (2007).

Zhou, F. and T. Scullion, "Overlay Tester: A Simple Performance Test for Thermal Reflective Cracking," *Journal of the Association of Asphalt Paving Technologists*, vol. 74, pp. 443-484 (2005).

Bennert, T., M. Worden, and M. Turo, "Field and Laboratory Forensic Analysis of Reflective Cracking on Massachusetts Interstate 495," *Transportation Research Record: Journal of the Transportation Research Board*, No. 2126, Transportation Research Board of the National Academies, Washington, D.C., pp. 27-38 (2009).

* cited by examiner

FUEL-RESISTANT LIQUID ASPHALT BINDERS AND METHODS OF MAKING THE SAME

BACKGROUND OF THE INVENTION

Field of the Invention

The present invention relates to fuel-resistant liquid asphalt binder. Specifically, embodiments of the present invention relate to a fuel-resistant liquid asphalt binder for improving one or more properties of a bituminous asphalt mix including, but not limited to, workability, flowability, corrosion resistance in the presence of a fuel, and resistance to fatigue cracking.

Background Art

Aside from roads and parking lots, one of the largest uses of pavement is for airport runways and tarmacs. Typically, the pavement is either concrete or a Hot Mix Asphalt (HMA). Concrete pavement is typically comprised of various Portland concrete cements mixed with aggregates and water. Concrete pavement is poured in place at an ambient temperature and it hardens as the concrete dries.

A HMA, on the other hand, is typically made using a liquid asphalt binder, which is a liquid residue left over after the lighter petroleum distillates have been removed from petroleum crude oil during a refining process. The binder is mixed with an aggregate and hauled to the place where it is to be installed. The paving process of HMA involves either laying a bed of asphalt mixture onto a prepared road bed or applying a thin overlay over an existing layer of pavement. The HMA is then compacted under controlled conditions using a roller or compactor while the mixture is still hot in order to achieve a predetermined density or air void content.

When HMA is used in airports, jet fuel is continually spilled onto the tarmac of the runways and taxiways while aircrafts are parked, taxiing, or awaiting clearance. This spillage can occur either through thermal expansion of fuel from the overflow port of the storage tank of an aircraft or a refueling vehicle, or from fuel being spilled during refueling. Upon contact with the HMA surface, the fuel will degrade the HMA and the HMA will eventually deteriorate and fall apart. Over time, this causes the pavement to rut and crack under the weight of an aircraft and other equipment. This reduces the effective life of these surfaces, resulting in premature replacement and repair, which increases the life-cycle costs of the runways and taxiways.

Historically, this problem has been solved in one of two ways. The first solution has been to replace the HMA pavement with a concrete surface, especially in areas that are prone to continual fuel spills. However, this solution has the drawback of being more expensive than using HMA and requires much longer down time to complete the job, which can be detrimental in busy airports.

The second solution has been to seal the surface of the HMA pavement by using a coal tar sealer applied to the surface. However, the use of coal tar sealers has three major drawbacks. First, coal tar has a coefficient of expansion different from a petroleum-based asphalt pavement. This can cause severe cracking of the sealer and breaches in the fuel-resistant layer. These cracks can allow fuel spills to penetrate into the pavement, causing further deterioration of the HMA underneath. Therefore, reapplication of the coal tar sealer every two or three years becomes necessary to maintain fuel resistance. Second, coal tar sealers are categorized as carcinogenic materials. Application of the coal tar sealers on HMA pavements introduces carcinogenic material into the pavement material, which is often recycled and used again in repaving operations. If not handled properly, workers may be exposed to coal tar fumes. Third, the coating must adhere to the surface of the HMA and there is the possibility that water and other foreign materials will leak through cracks in the coating into the junction between the coating and the surface. These foreign materials can compromise the ability of the coating to bind with the surface, which can be made worse by freezing and/or mechanical action at the junction. This problem is further exacerbated in airports by the weight of large aircraft on the surface.

One of the more recent developments in the HMA industry has been the development of polymer-modified asphalt binders. Polymer-modified asphalt binders can be used to make HMA with increased resistance to permanent deformation, reflective fatigue, and thermal cracking Unfortunately, spillage of jet fuel that softens standard HMAs will also soften the commonly used polymer-modified asphalts, resulting in a decrease of the integrity (stability) of the asphalt. Thus, while enjoying some benefits over the traditional HMA formulations, the polymer-modified asphalts still require an application of coal tar sealants in order to resist fuel spills.

Efforts have been made to increase the fuel resistance by using coating for HMA. U.S. Pat. No. 5,010,129 provides an example of such a fuel-resistant coating. However, coatings are problematic because the adherence of the coating to the HMA surface will deteriorate over time, which can result in cracking. These cracks can allow fuel spills to penetrate into the pavement, causing further deterioration of the HMA underneath As such, there is a need for an HMA that resists deterioration from exposure to corrosive substances, such as fuel and hydraulic fluid, in particular jet fuel, and that has longer longevity than either a standard HMA pavement or an asphalt pavement having a fuel-resistant coating. The HMA should resist deterioration without requiring the application of coal tar and withstand the high standing weight of aircraft and commercial vehicles without rutting and failure.

BRIEF SUMMARY OF THE INVENTION

Some embodiments are directed to a fuel-resistant liquid asphalt binder including a liquid asphalt binder base having a concentration in the range of 89.3 wt % to 95.6 wt %, styrene-butadiene-styrene having a concentration in the range of 2 wt % to 5 wt %, high acetate content ethyl vinyl acetate having a concentration in the range of 2 wt % to 5 wt %, and a composition of fatty amine derivatives having a concentration in the range of 0.4 wt % to 0.7 wt %.

In some embodiments, the styrene-butadiene-styrene has a concentration in the range of 3 wt % to 4 wt % in the fuel-resistant liquid asphalt binder. In some embodiments, the high acetate content ethyl vinyl acetate has a concentration in the range of 3 wt % to 4 wt % in the fuel-resistant liquid asphalt binder. In some embodiments, the composition of fatty amine derivatives has a concentration in the range of 0.45 wt % to 0.55 wt % in the fuel-resistant liquid asphalt binder.

In some embodiments, the fuel-resistant liquid asphalt binder has an ASTMD7173 maximum temperature difference of less than or equal to 40° F. when using an ASTM D36 Ring and Ball apparatus. In some embodiments, the fuel-resistant liquid asphalt binder has a minimum performance grade of PG 82-22. In some embodiments, the fuel-resistant liquid asphalt binder has an ASTM D6084 elastic recovery at 25° C. of greater than or equal to 85%.

Some embodiments are directed to a bituminous asphalt mix including a fuel-resistant liquid asphalt binder including a liquid asphalt binder base having a concentration in the range of 89.3 wt % to 95.6 wt %, styrene-butadiene-styrene having a concentration in the range of 2 wt % to 5 wt %, high acetate content ethyl vinyl acetate having a concentration in the range of 2 wt % to 5 wt %, and a composition of fatty amine derivatives having a concentration in the range of 0.4 wt % to 0.7 wt %. The bituminous asphalt mix also including air voids and an aggregate.

In some embodiments, the fuel-resistant liquid asphalt binder has a concentration in the range of 4 wt % to 9 wt % in the bituminous asphalt mix. In some embodiments, the air voids have a concentration in the range of 2 vol % to 3 vol % in the bituminous asphalt mix.

In some embodiments, the bituminous asphalt mix has a weight loss by fuel immersion of less than 2.5% when measured according to FAA P-601 test specifications.

Some embodiments are directed to a method of making a fuel-resistant liquid asphalt binder, the method including mixing a liquid asphalt binder base and styrene-butadiene-styrene in a high shear mixer, thereby forming a first mixture, adding at least one cross-linking agent to the first mixture, curing the first mixture, mixing the first mixture with high acetate content ethyl vinyl acetate in a high shear mixer, thereby forming a second mixture, and mixing a composition of fatty amine derivatives with the second mixture, thereby forming the fuel-resistant liquid asphalt binder. Where the liquid asphalt binder base has a concentration in the range of 89.3 wt % to 95.6 wt % in the fuel-resistant liquid asphalt binder, the styrene-butadiene-styrene has a concentration in the range of 2 wt % to 5 wt % in the fuel-resistant liquid asphalt binder, the high acetate content ethyl vinyl acetate has a concentration in the range of 2 wt % to 5 wt % in the fuel-resistant liquid asphalt binder, and the composition of fatty amine derivatives has a concentration in the range of 0.4 wt % to 0.7 wt % in the fuel-resistant liquid asphalt binder.

In some embodiments, the styrene-butadiene-styrene has a concentration in the range of 3 wt % to 4 wt % in the fuel-resistant liquid asphalt binder. In some embodiments, the high acetate content ethyl vinyl acetate has a concentration in the range of 3 wt % to 4 wt % in the fuel-resistant liquid asphalt binder. In some embodiments, the composition of fatty amine derivatives has a concentration in the range of 0.45 wt % to 0.55 wt % in the fuel-resistant liquid asphalt binder.

Some embodiments are directed to a method of making a bituminous asphalt mix, the method including mixing a liquid asphalt binder base and styrene-butadiene-styrene in a high shear mixer, thereby forming a first mixture, adding at least one cross-linking agent to the first mixture, curing the first mixture, mixing the first mixture with high acetate content ethyl vinyl acetate in a high shear mixer, thereby forming a second mixture, mixing a composition of fatty amine derivatives with the second mixture, thereby forming a fuel-resistant liquid asphalt binder, and mixing the fuel-resistant liquid asphalt binder with an aggregate. Where the liquid asphalt binder base has a concentration in the range of 89.3 wt % to 95.6 wt % in the fuel-resistant liquid asphalt binder, the styrene-butadiene-styrene has a concentration in the range of 2 wt % to 5 wt % in the fuel-resistant liquid asphalt binder, the high acetate content ethyl vinyl acetate has a concentration in the range of 2 wt % to 5 wt % in the fuel-resistant liquid asphalt binder, and the composition of fatty amine derivatives has a concentration in the range of 0.4 wt % to 0.7 wt % in the fuel-resistant liquid asphalt binder.

In some embodiments, the fuel-resistant liquid asphalt binder has a concentration in the range of 4 wt % to 9 wt % in the bituminous asphalt mix. In some embodiments, the bituminous asphalt mix includes air voids having a concentration in the range of 2 vol % to 3 vol % in the bituminous asphalt mix.

BRIEF DESCRIPTION OF THE DRAWINGS/FIGURES

The disclosure will be readily understood by the following detailed description in conjunction with the accompanying drawings, where like reference numerals designate like structural elements, and in which.

DETAILED DESCRIPTION OF THE INVENTION

Figure 1:
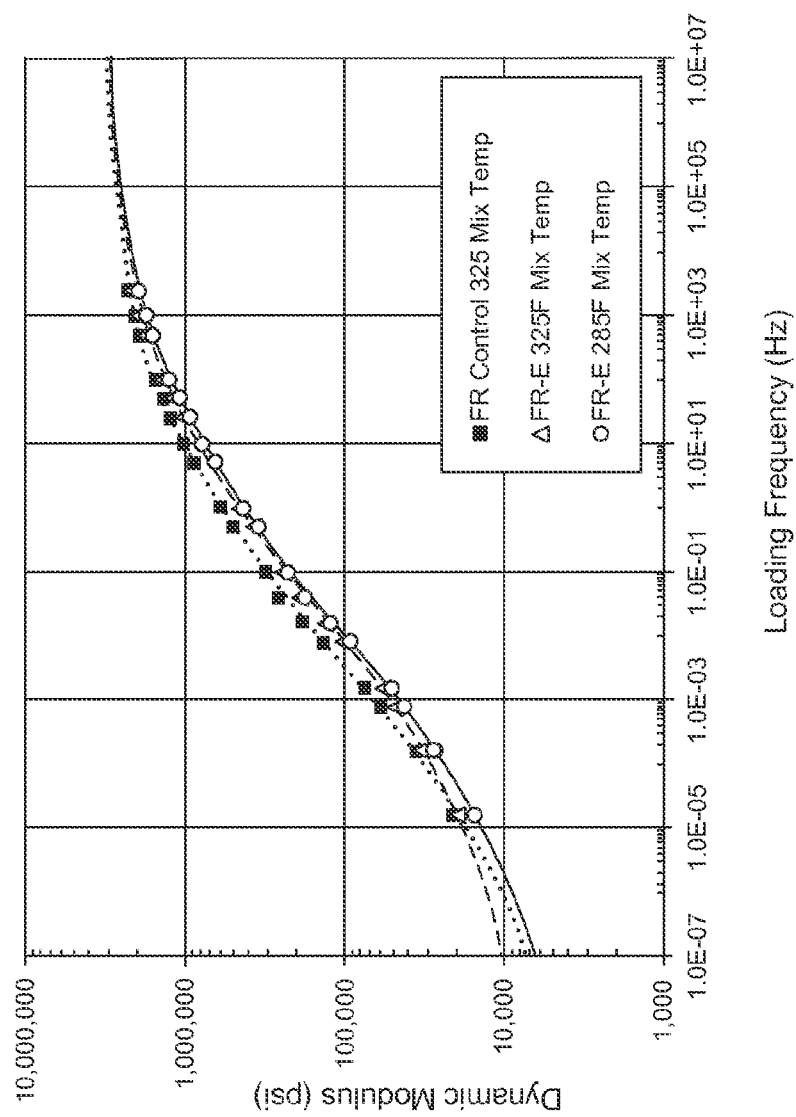
FIG. 1 is a graph comparing the stiffness for different fuel-resistant asphalts including two fuel-resistant asphalts according to an embodiment of the present invention.

The present invention will now be described in detail with reference to embodiments thereof as illustrated in the accompanying drawings, in which like reference numerals are used to indicate identical or functionally similar elements. References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present invention. Other suitable modifications and adaptations of the variety of conditions and parameters normally encountered in the field, and which would be apparent to those skilled in the art, are within the spirit and scope of the invention.

Some embodiments relate to a fuel-resistant liquid asphalt binder including a composition of fatty amine derivatives. In some embodiments, the fuel-resistant liquid asphalt binder may also include styrene-butadiene-styrene (SBS). In some embodiments, the fuel-resistant liquid asphalt binder may also include high acetate content ethylene vinyl acetate (EVA). In some embodiments, the fuel-resistant liquid asphalt binder may include a composition of fatty amine derivatives, SBS, and EVA. The fuel-resistant liquid asphalt binder may be used to create a hot mix asphalt (HMA) (i.e., a bituminous asphalt mix) that resists corrosion in the presence of a fuel, including aircraft jet fuel and hydraulic oil. In some embodiments, the fuel-resistant liquid asphalt binder may be mixed with an aggregate to produce a hot mix asphalt having a vol % of air voids within a predetermined range. In some embodiments, the fuel-resistant liquid asphalt binder and the resulting asphalt are prepared according to the requirements contained in the Federal Aviation Administration (FAA) asphalt specification P-601 and using the materials discussed herein.

The American Society for Testing and Materials (ASTM) and the American Association of State Highway and Transportation Officials (AASHTO) have developed standard specifications for varying performance grade (PG) asphalts, and the standards cited herein are hereby incorporated by reference in their entirety. The FAA's standard fuel-resistant HMA specification is Item P-601 found in AC 150/5370-10G, entitled "Standards for Specifying Construction of Airports". Specification Item P-601 references ASTM and AASHTO standards to provide a fuel-resistant asphalt mix design criteria for use in airport applications.

Four different basic methods have been typically used in the design of a HMA mixture: the Marshall method, the Hveem method, the Superpave method, and the Strategic Highway Research Program (SHRP) method. The HMA according to one embodiment of the present invention may be designed using any of the above methods. Preferably, the HMA discussed herein is designed using the Marshall method. Table 1 details some design criteria related to the Marshal method.

TABLE 1

Marshal Method Design Criteria

| Test Properties | All Aircraft |
| --- | --- |
| Number of blows | 50 |
| Stability, Lbs. - min. | 2150 |
| Air Voids (%)* | 2.5% +/− 0.2 |
| % VMA - min* | 14 |
| % weight loss by fuel immersion - max (tested per FAA Engineering Brief (FRXXX))** | 1.5 |

*If the water absorption of the combined aggregates in the mix exceeds 1.7% (ASTM D127 & D128), then the mix must be short term aged in accordance with AASHTO R 30, Sec. 7.2. The short term aged material will then be used for the Marshall specimens and the maximum specific gravity test (ASTM D2041).
**This criterion represents the degree to which a fuel-resistant liquid asphalt binder resists corrosion due to jet fuel.

The weight loss by fuel immersion in Table 1 may be determined using the following procedure. (1) Prepare three test samples in accordance with the Mix Design requirements of P-601 at optimum binder content and a desired range of air voids, e.g. 4 vol %±0.4 air voids. (2) Evaluate each sample to determine its percentage of air voids. If the percentage of air voids does not meet specified design criteria, the specimen is discarded and replaced. (3) Dry each sample under a fan at room temperature (68° F.-80° F.) for a period of at least 24 hours. (4) Completely submerge each sample in a kerosene bath at room temperature (68° F.-80° F.) for a period of 2 minutes±30 seconds. The kerosene used in the kerosene bath must meet the requirements of U.S. Federal Specification VV-K-211, Kerosene, which is included herein by reference in its entirety. Suspending each sample with insect screen in a one gallon paint can filled with kerosene has been found to provide satisfactory results. (5) After submersion, remove each sample from the kerosene and immediately surface dry the samples using a clean paper towel. (6) After surface drying, weigh each sample to determine its weight to the nearest 0.1 gram. This is recorded as the "Weight Before" and designated as "A". (7) Submerge each sample in kerosene again for 24 hours. (8) Remove each sample from the kerosene, place it on an absorptive cloth or paper towel, and dry it under a fan at room temperature for 24 hours±10 minutes. (9) Weigh each sample again. This second weight is recorded as "Weight After Immersion" and designated as "B". (10) Calculate the fuel resistance of each sample using the following formula:

% of weight loss by fuel immersion=$(A-B/A)\times100$

In one embodiment, a fuel-resistant hot mix asphalt may include two major components: an aggregate and a liquid asphalt binder. The aggregate may include at least one coarse particulate material, including, but not limited to, sand, crushed gravel, and crushed stone. In some embodiments, the aggregate may have a specific gradation (i.e., size distribution). In some embodiments, the gradation may be within the limits shown in Table 2.

TABLE 2

Aggregate Size Distribution for an HMA Mix According to Some Embodiments

| Sieve Size | 12.5 mm mix*** % passing by weight |
| --- | --- |
| 12.5 mm | 100 |
| 9.5 mm | 79-99 |
| 4.75 mm | 58-78 |
| 2.36 mm | 39-59 |
| 1.18 mm | 26-46 |
| 0.60 mm | 19-35 |
| 0.30 mm | 12-24 |
| 0.15 mm | 7-17 |
| 0.075 mm | 3-6 |

| | % binder |
| --- | --- |
| Stone or gravel | 5.5-8.0 |
| Slag | 7.0-10.5 |

***This mix may be used as a surface course, recommended thickness is 1.5 inches When the aggregate is mixed with a fuel-resistant liquid asphalt binder, a flowable and formable mixture results. This formable mixture is called a hot mix asphalt (HMA) or a bituminous asphalt mix. The liquid asphalt binder serves to hold the aggregate particles together and influences the overall viscosity, flowability, and workability of the resulting bituminous asphalt mix. One the bituminous asphalt mix is compacted and cooled; it can be used as an asphalt surface (e.g., a tarmac, a landing strip, a highway, a parking lot, etc.). In some embodiments, the fuel-resistant liquid asphalt binder is prepared so that it meets the criteria listed in Federal Aviation Administration (FAA) P-601 specification. Specifically, the fuel-resistant liquid asphalt binder may meet at least one of the following criteria listed in P-601: (i) a minimum performance grade of PG 82-22 (graded according to ASTM D6373 or AASHTO M320), (ii) an elastic recovery of greater than or equal to 85% at 25 C.° (tested according to ASTM D6084), and (iii) a maximum temperature difference of 40° F. (4° C.) when tested using an ASTM D36 Ring and Ball apparatus (tested according to ASTM D7173). In some embodiments, the fuel-resistant liquid asphalt binder may meet all the criteria (i)-(iii). In some embodiments, the performance grade of liquid asphalt binder may be PG 82-22 FR.

In one embodiment, the fuel-resistant liquid asphalt binder includes a liquid asphalt binder base and at least one additive. The additive(s) may be used to alter the viscosity, flowability, workability, and/or corrosion resistance of a bituminous asphalt mix. The additives may be, but are not limited to, crosslinking agents, polymers, copolymers, and amines. In some embodiments, the liquid asphalt binder includes a liquid asphalt binder base having a concentration between 89.3 wt % to 95.6 wt %. In some embodiments, the liquid asphalt binder includes a liquid asphalt binder base having a concentration between 90 wt % and 95 wt %. The liquid asphalt binder base may a conventional liquid asphalt binder. For example, the liquid asphalt binder base may be a conventional PG 82-22 liquid asphalt binder (i.e., a liquid asphalt binder without additives having a PG of 82-22).

In some embodiments, the fuel-resistant liquid asphalt binder includes a crosslinking agent. The cross-linking agent may be added to increase the linking of SBS chains within the fuel-resistant liquid asphalt binder, thus increasing the stability of the fuel-resistant liquid asphalt binder. The cross-linking agent may be, but is not limited to sulfur or sulfur containing compounds. In some embodiments, the concentration of crosslinking agent in the fuel-resistant liquid asphalt binder is between 0.05 wt % and 0.5 wt %. In some embodiments, the concentration of crosslinking agent in the fuel-resistant liquid asphalt binder is between 0.10 wt % and 0.25 wt %. In some embodiments, the concentration of crosslinking agent in the fuel-resistant liquid asphalt binder is 0.15 wt %. In some embodiments, the concentration of crosslinking agent in the fuel-resistant liquid asphalt binder is 0.20 wt %.

In some embodiments, the fuel-resistant liquid asphalt binder includes styrene-butadiene-styrene (SBS). SBS may be added to improve the corrosion resistance to jet fuel and hydraulic oil. In some embodiments, the concentration of SBS in the fuel-resistant liquid asphalt binder is between 2 wt % and 5 wt %. In some embodiments, the concentration of SBS in the fuel-resistant liquid asphalt binder is between 3 wt % and 4 wt %.

In some embodiments, the fuel-resistant liquid asphalt binder includes high acetate content ethylene vinyl acetate (EVA). EVA may be added to improve the corrosion resistance to jet fuel and hydraulic oil. In some embodiments, the concentration of EVA in the fuel-resistant liquid asphalt binder is between 2 wt % and 5 wt %. In some embodiments, the concentration of EVA in the fuel-resistant liquid asphalt binder is between 3 wt % and 4 wt %.

In some embodiments, the fuel-resistant liquid asphalt binder includes a composition of fatty amine derivatives. The composition of fatty amine derivatives may be added to improve one or more properties of a bituminous asphalt mixture, including but not limited to, the workability of the bituminous asphalt mixture, the flowability of the bituminous asphalt mixture, the adherence of the liquid asphalt binder to the aggregate within the bituminous asphalt mixture, corrosion resistance in the presence of a fuel, and resistance to fatigue cracking. The composition of fatty amine derivatives may also reduce the amount of harmful fumes emitted during production of a bituminous asphalt mixture and reduce the mixing temperature required for mixing the fuel-resistant liquid asphalt binder with the aggregate. An improvement in the flowability and workability of a bituminous asphalt mixture allows the liquid asphalt binder to be mixed with the aggregate at low temperatures. Lowering the mixing temperature decreases the consumption of energy required to produce a HMA, thus making the production more environmentally friendly. Reducing harmful fumes also reduces the environmental impact of the production of the HMA.

In some embodiments, the composition of amine derivatives allows the fuel-resistant liquid asphalt binder to be mixed with aggregate at a temperature between 330° F. and 280° F. (compared to conventional temperatures ranging from 325° F. to 360° F.). In some embodiments, the composition of amine derivatives allows the fuel-resistant liquid asphalt binder to be mixed with aggregate at a temperature between 300° F. and 320° F. In some embodiments, the composition of amine derivatives allows the fuel-resistant liquid asphalt binder to be mixed with aggregate at a temperature between 280° F. and 290° F. In some embodiments, the composition of amine derivatives allows the fuel-resistant liquid asphalt binder to be mixed with aggregate at 285° F.

In one embodiments the composition of amine derivatives may comprise, but is not limited to, Evotherm® M1 produced by MeadWestvaco Corporation, 5255 Virginia Avenue, North Charleston, S.C. In some embodiments, the concentration of the composition of amine derivatives in the fuel-resistant liquid asphalt binder is between 0.4 wt % and 0.7 wt %. In some embodiments, the concentration of the composition of amine derivatives in the fuel-resistant liquid asphalt binder is between 0.45 wt % and 0.55 wt %.

The addition of Evotherm® M1 into a fuel-resistant liquid asphalt binder having SBS and EVA produces a fuel-resistant liquid asphalt binder having highly beneficial properties for use in airport applications. The discussion below describes properties of three different fuel-resistant (FR) asphalts made with different fuel-resistant liquid asphalt binders. The three different FR asphalts were tested using various test specifications to evaluate and compare their properties. Specifically, two FR asphalts made using a liquid asphalt binder according an embodiment of the present invention (FR-E 285F and FR-E 325F) were tested against a FR control asphalt (FR Control 325F). The comparison between the FR-E asphalts and the FR control asphalt demonstrates the effectiveness of an asphalt made using a liquid asphalt binder including SBS, EVA, and a composition of fatty amine derivatives according to an embodiment of the present invention.

"FR Control 325F" or "FR Control" refers asphalt samples produced using a conventional fuel-resistant liquid asphalt binder having a concentration of 3.6 wt % SBS and 3.6 wt % EVA. Each FR Control 325F sample was mixed at 325° F. and compacted at 310° F. "FR-E 325F" refers to asphalt samples made using a fuel-resistant liquid asphalt binder having a concentration of 3.6 wt % SBS, 3.6 wt % EVA, and 0.5 wt % Evotherm® M1. Each FR-E 325F sample was mixed at 325° F. and compacted at 310° F. "FR-E 285F" refers to asphalt samples made using a fuel-resistant liquid asphalt binder having a concentration of 3.6 wt % SBS, 3.6 wt % EVA, and 0.5 wt % Evotherm® M1. Each FR-E 285F sample was mixed at 285° F. and compacted at 275° F.

The FR asphalt mixtures used to make all the samples were designed in accordance with the FAA P-601 specification, except hydrated lime was not used in the FR mixtures, as is specified under P601 for use as an anti-strip. Table 3 shows the volumetric properties of the P601 FR asphalt mixture used in the study. "Lab Study Design" shows the properties of the samples tested and "Control" shows the P-601 specifications. The aggregates used in the study were a granite-gneiss from Tilcon Mt. Hope quarries. All liquid asphalt binder used in the study was supplied by Axeon Specialty Products in Paulsboro, N.J. All test samples, except for the test samples tested for fuel resistance, were short term oven-aged (STOA) in accordance with AASHTO R30 to simulate oxidative aging that generally occurs due to plant production and immediate service life in the field.

TABLE 3

Gradation and Volumetric Properties of the P-601 FR asphalts

| Property | % Passing | |
|---|---|---|
| Sieve Size | Lab Study Design | Control |
| ½" (12.5 mm) | 100.0 | 100.0 |
| ⅜" (9.5 mm) | 96.2 | 79-99 |
| No. 4 (4.75 mm) | 69.2 | 58-78 |
| No. 8 (2.36 mm) | 45.0 | 39-59 |
| No. 16 (1.18 mm) | 33.4 | 26-46 |
| No. 30 (0.600 mm) | 24.1 | 19-35 |
| No. 50 (0.425 mm) | 15.3 | 12-24 |
| No. 100 0.15 mm) | 8.1 | 7-17 |
| No. 200 (0.075 mm) | 4.5 | 3-6 |
| Gsb (g/cm³) | 2.612 | |
| Gmm (g/cm³) | 2.403 | |
| Design AV % | 2.5 | 1.8-3.2% |
| Asphalt Content (%) | 7.5 | |
| VMA (%) | 17.0 | >14% |

The study evaluated various properties of the three different asphalts (i.e., FR Control 325F, FR-E 325F, and FR-E 285F). The evaluated properties were as follows. (1) Dynamic modulus was tested using AASHTO TP79. (2) Rut resistance was tested with (a) an Asphalt Mixture Performance Tester (AMPT) Repeated Low Flow Number according to AASHTO TP79 and with (b) an Asphalt Pavement Analyzer (APA) according to AASHTO T340. (3) Fatigue cracking potential was tested using (a) a flexural beam test according to AASHTO T321 and (b) an overlay tester according to TxDOT TEX-248F. (4) Moisture damage potential was tested using a Wet Hamburg Wheel Tracking Test according to AASHTO T324. (5) Fuel resistance was tested according to FAA P-601. The results comparing the three different asphalts are discussed below.

Dynamic Modulus (AASHTO TP79)

The dynamic modulus of asphalt mixtures provides an assessment of the overall stiffness properties of the asphalt mixture. Asphalt mixtures with higher stiffness at elevated temperatures will be more rut resistant at higher temperatures. Meanwhile, asphalt mixtures with lower stiffness properties at intermediate and lower temperatures will generally be less likely to result in intermediate and low temperature cracking.

Dynamic modulus and phase angle data were measured and collected in uniaxial compression using the Simple Performance Tester (SPT) following the method outlined in AASHTO TP79, "Determining the Dynamic Modulus and Flow Number for Hot Mix Asphalt (HMA) Using the Asphalt Mixture Performance Tester (AMPT)." The data was collected at three temperatures; 4° C., 20° C., and 45° C. using loading frequencies of 25, 10, 5, 1, 0.5, 0.1, and 0.01 Hz. The collected modulus values of the varying temperatures and loading frequencies were used to develop dynamic modulus master stiffness curves and temperature shift factors using numerical optimization of Equations 1 and 2. The reference temperature used for the generation of the master curves and the shift factors was 20° C.

$$\log|E^*| = \delta + \frac{(\text{Max} - \delta)}{1 + e^{\beta+\gamma\{\log\omega + \frac{\Delta E_a}{19.14714}[(\frac{1}{T})-(\frac{1}{T_r})]\}}}$$ (Equation 1)

where:
$|E^*|$=dynamic modulus, psi
$\omega_r$=reduced frequency, Hz
Max=limiting maximum modulus
$\delta$, $\beta$, and $\gamma$=fitting parameters $$\log[a(T)] = \frac{\Delta E_a}{19.14714}\left(\frac{1}{T} - \frac{1}{T_r}\right)$$ (Equation 2)

where:
$a(T)$=shift factor at temperature T
$T_r$=reference temperature, ° K
T=test temperature, ° K
$\Delta E_a$=activation energy (treated as a fitting parameter)

FIG. 1 shows the master stiffness curves of the three fuel-resistant mixtures. The master stiffness curves show that the FR Control 325F mixture is generally stiffer than the FR-E mixtures, especially at the intermediate temperature range. As the test temperature increases (left side of the master curve chart), all three mixtures converge indicating that all three FR mixtures should save similar high temperature behavior. Overall, it appears that both FR-E mixtures had very similar stiffness properties while the FR Control mixture was slightly stiffer. As such, it can be seen that the addition of Evotherm® M1 has minimal effect on the stiffness of the asphalt samples, regardless of the temperature at which the samples were mixed and compacted.

Rut Resistance (AASHTO TP79)

Repeated load permanent deformation testing was measured and collected in uniaxial compression using the Simple Performance Tester (SPT) following the method outlined in AASHTO TP79, "Determining the Dynamic Modulus and Flow Number for Hot Mix Asphalt (HMA) Using the Asphalt Mixture Performance Tester (AMPT)." The unconfined repeated load tests were conducted with a deviatoric stress of 600 kPa and at a test temperature of 54° C., which corresponds to approximately New Jersey's average 50% reliability high pavement temperature at a depth of 20 mm according the LTPPBind 3.1 software. These testing parameters (temperature and applied stress) conform to the recommendations currently proposed in NCHRP Project 9-33, *A Mix Design Manual for Hot Mix Asphalt*. Testing was conducted until a permanent vertical strain of 5% or 10,000 cycles was obtained.

Figure 2:
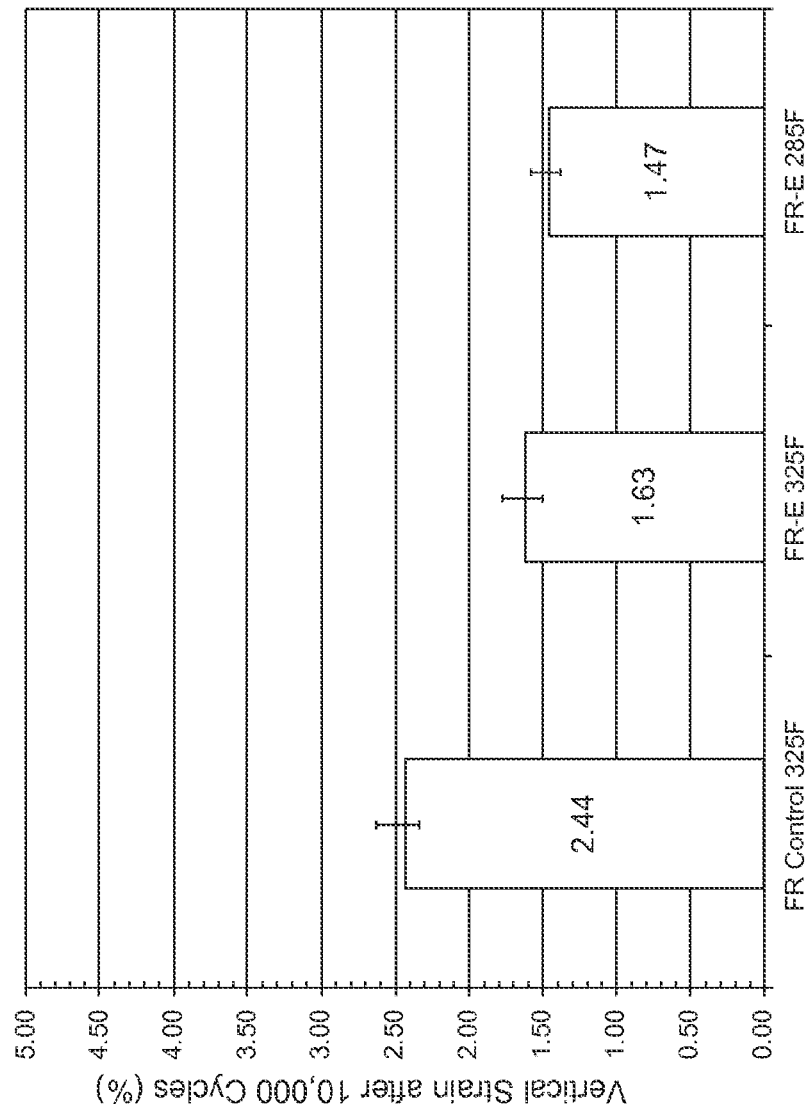
FIG. 2 is a graph comparing the vertical stain after 10,000 loading cycles for different fuel-resistant asphalts including two fuel-resistant asphalts according to an embodiment of the present invention.

The test results are shown in Table 4. Table 4 indicates that all three mixtures are rut resistant. In only one case did a test specimen reach tertiary flow (i.e. —Flow Number). To provide for comparison, the accumulated permanent strain at 10,000 cycles was used to compare the rutting performance of the different mixtures. This is shown in FIG. 2. As shown in FIG. 2, the FR-E samples were more rut resistant than the FR Control 325F samples. Both the FR-E mixtures resulted in very similar permanent strains, while the FR Control 325F mixture resulted in a higher permanent strain after 10,000 loading cycles. FR-E 325F and FR-E 285F samples had an average permanent vertical strain of 1.63 and 1.47, respectively, while FR Control 325F samples had an average permanent vertical strain of 2.44. As shown in FIG. 2, the bituminous asphalt mix according to some embodiments of the present invention may have a vertical strain of no more than 1.75 when measured in accordance with AASHTO TP79 test specifications. Although all of the mixtures resulted in similar Flow Number results, the FR-E mixtures displayed better rutting resistance in the Asphalt Mixture Performance Tester (AMPT).

TABLE 4

Repeated Load Flow Number Test Results for Fuel-resistant Asphalt Mixtures

| Mix Type | Sample ID | Flow Number (cycles) | Cycle to Achieve 5% Strain | Strain at 10,000 Cycles (%) |
|---|---|---|---|---|
| FR Control | 1 | >10,000 | >10,000 | 2.59 |
|  | 2 | >10,000 | >10,000 | 2.22 |
|  | 3 | 8,820 | >10,000 | 2.50 |
|  | Average | N.A. | N.A. | 2.44 |
|  | Std Dev | N.A. | N.A. | 0.20 |
|  | COV % | N.A. | N.A. | 8.01 |
| FR-E 325F | 1 | >10,000 | >10,000 | 1.77 |
|  | 2 | >10,000 | >10,000 | 1.64 |
|  | 3 | >10,000 | >10,000 | 1.48 |
|  | Average | N.A. | N.A. | 1.63 |
|  | Std Dev | N.A. | N.A. | 0.15 |
|  | COV % | N.A. | N.A. | 9.02 |
| FR-E 285F | 1 | >10,000 | >10,000 | 1.58 |
|  | 2 | >10,000 | >10,000 | 1.36 |
|  | 3 | >10,000 | >10,000 | 1.47 |
|  | Average | N.A. | N.A. | 1.47 |
|  | Std Dev | N.A. | N.A. | 0.11 |
|  | COV % | N.A. | N.A. | 7.72 |

Rut Resistance (AASHTO T340)

Compacted asphalt mixtures were tested for rutting potential using an Asphalt Pavement Analyzer (APA) in accordance with AASHTO T340, "Determining Rutting Susceptibility of Asphalt Paving Mixtures Using the Asphalt Pavement Analyzer (APA)." Prior to testing, the samples were conditioned for a minimum of 6 hours at the test temperature of 64° C. The samples are tested for a total of 8,000 cycles using a hose pressure of 100 psi and wheel load of 100 lbs. Rutting was measured throughout the test. However, the final rutting performance is generally only shown after 8,000 loading passes have been applied.

Figure 3:
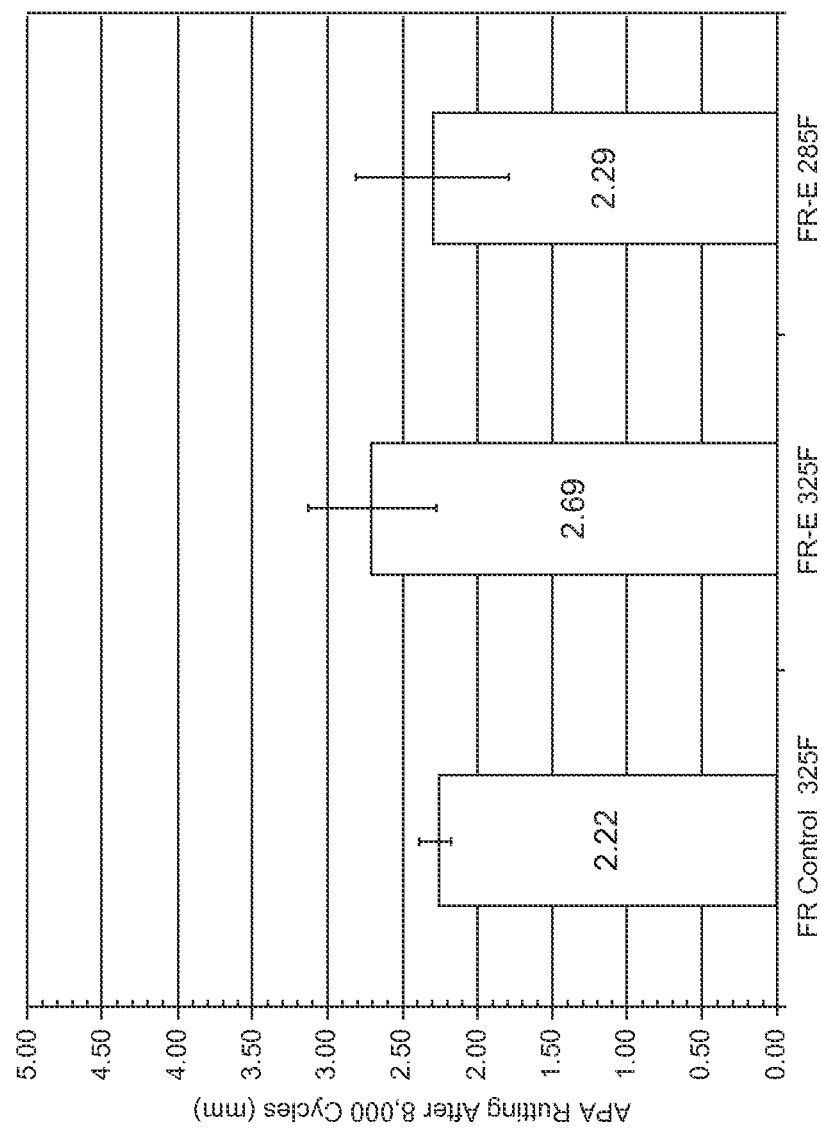
FIG. 3 is a graph comparing rutting potential for different fuel-resistant asphalts including two fuel-resistant asphalts according to an embodiment of the present invention.

The APA rutting for the three fuel-resistant mixtures are shown in FIG. 3. The test results indicate that all three asphalt mixtures performed extremely similar to one another, as indicated by the average value and standard deviation noted in the bar chart. From the APA test, it would appear that all three mixtures resulted in APA rutting statistically equal to one another.

Flexural Beam Fatigue (AASHTO T321)

The flexural beam fatigue test evaluates the crack initiation properties of an asphalt mixture in flexural mode. Mixtures that have better flexural fatigue properties will resist cracking longer due to stresses resulting from traffic (i.e. plane and automobile traffic) "flexing" the asphalt. Fatigue testing was conducted using the flexural beam fatigue test procedure outline in AASHTO T321, "Determining the Fatigue Life of Compacted Hot-Mix Asphalt (HMA) Subjected to Repeated Flexural Bending." The applied tensile strain levels used for the fatigue evaluation were; 700, 900, 1100, 1300 and 1500 micro-strains.

Samples used for the flexural beam fatigue test were compacted using a vibratory compactor designed to compact brick samples of 400 mm in length, 150 mm in width, and 100 mm in height. After compaction and aging was complete, the samples were trimmed to within the recommended dimensions and tolerances specified under AASHTO T321 and the test conditions utilized were those recommended by AASHTO T321. The samples were tested at a temperature of 15° C. The loading was a stain-controlled mode of loading and was applied in a sinusoidal waveform fashion with a loading frequency of 10 Hz.

Figure 4:
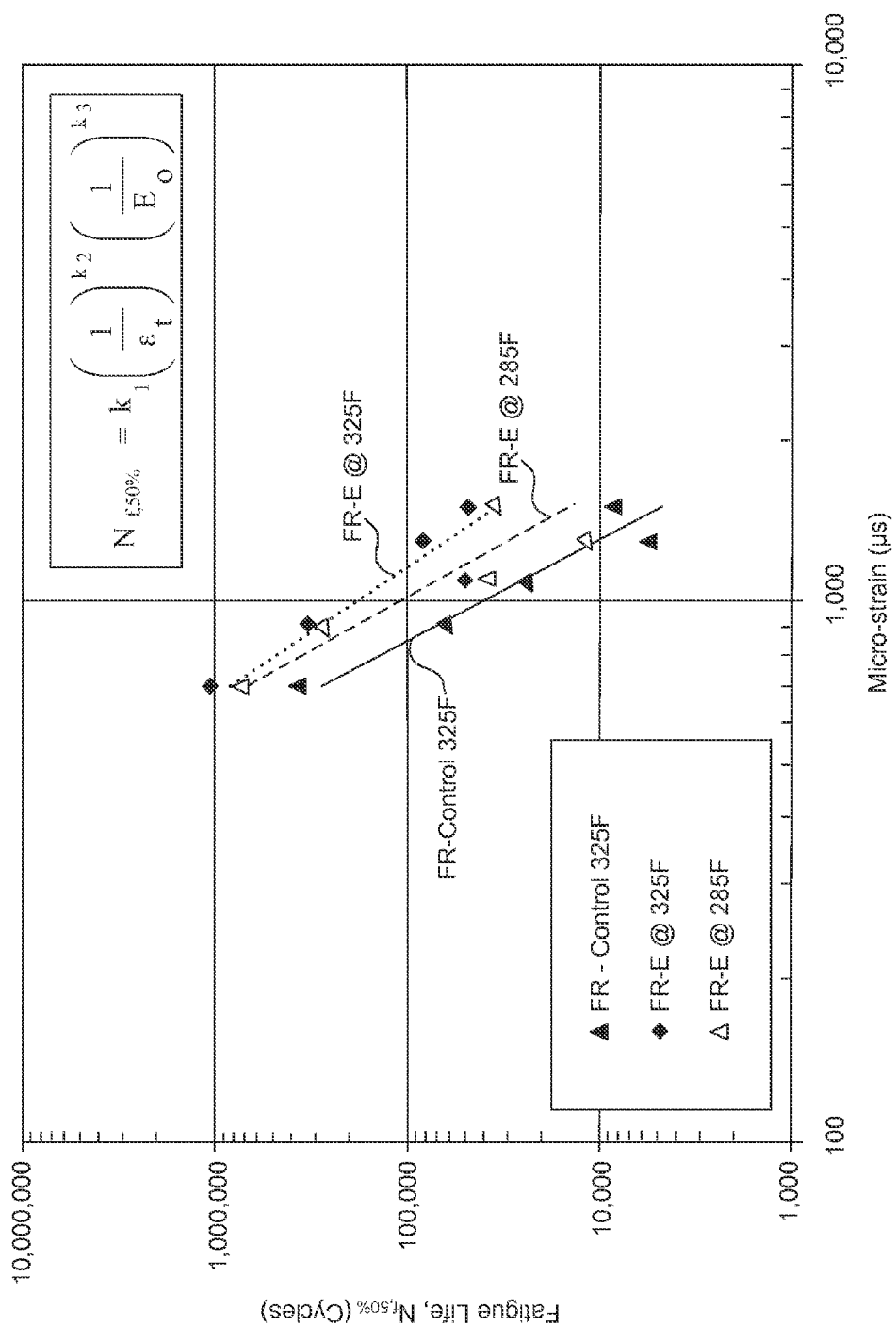
FIG. 4 is a graph comparing the flexural fatigue for different fuel-resistant asphalts including two fuel-resistant asphalts according to an embodiment of the present invention.

The test results from the flexural fatigue testing are shown in FIG. 4. The test results indicate that both of the FR-E mixtures were superior at resisting the initiation of cracking due to flexural bending when compared to the FR Control 325F mixture. FR-E 325F samples showed slightly better flexural fatigue performance than the FR-E 285F samples. FIG. 4 shows that the addition of Evotherm® M1 increases the crack resistance of the asphalt samples made using a fuel-resistant liquid asphalt binder according to an embodiment of the present invention. Not only did Evotherm® M1 increase the crack resistance for samples mixed at 325° F., but Evotherm® M1 also increased the crack resistance while allowing the asphalt to be mixed at a lower temperature (285° F. for FR-E 285F rather than 325° F. for FR Control 325F).

Overlay Tester (TxDOT TEX-248F)

The overlay tester also measures an asphalt mixture's resistance to crack propagation. Mixtures that perform better in the overlay tester are able to better resist a crack propagating through the asphalt mixture, similar to a crack initiating at the bottom of an asphalt pavement and propagating to the surface of the pavement.

The overlay tester, described by Zhou and Scullion (2007), has been shown to provide an excellent correlation to field cracking for both composite pavements (Zhou and Scullion, 2007; Bennert et al., 2009) as well as flexible pavements (Zhou et al., 2007). Sample preparation and test parameters followed that of TxDOT TEX-248F, "Overlay Test for Determining Crack Resistance of HMA." The samples were tested at 25° C. (77° F.). The opening width was 0.025 inches. The cycle time was 10 seconds (5 seconds loading, 5 seconds unloading). A sample's failure was defined as 93% reduction in its initial load.

Figure 5:
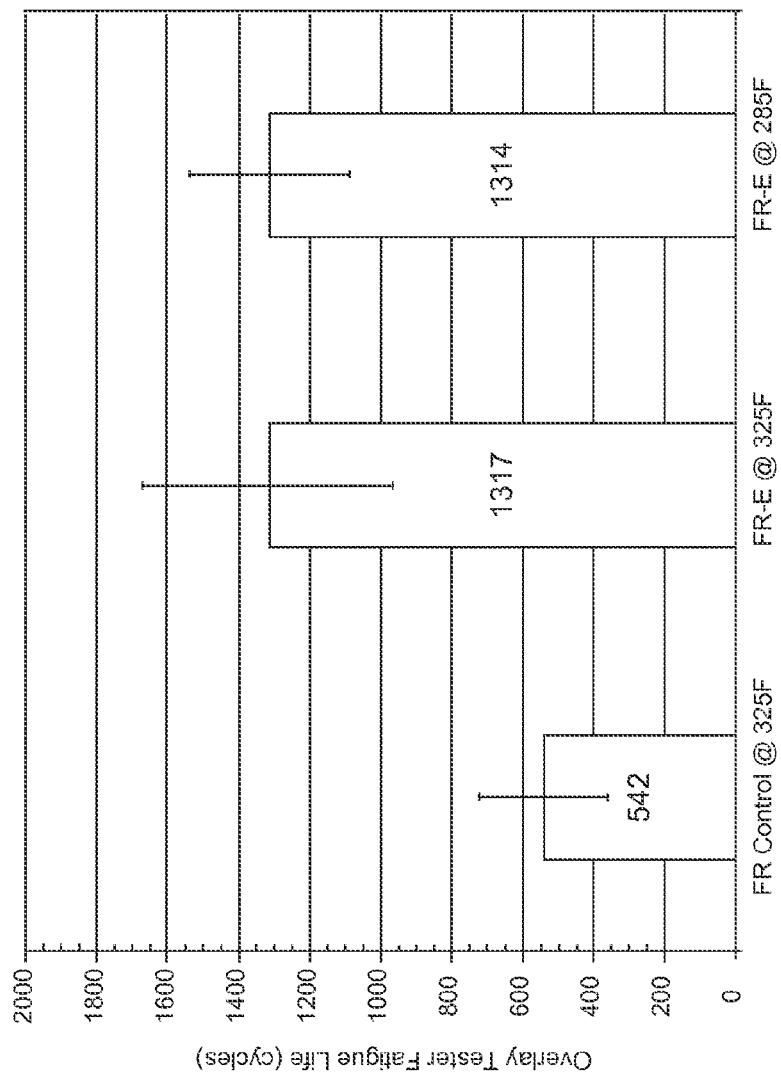
FIG. 5 is graph comparing the fatigue life for different fuel-resistant asphalts including two fuel-resistant asphalts according to an embodiment of the present invention.

Five test samples for each type of asphalt (i.e., FR-Control 325F, FR-E 325F, and FR-E 285F) were tested. The high and low values were discarded and the averages of the middle three values are shown in FIG. 5. The test results clearly indicate that both asphalt mixtures made with a fuel-resistant liquid asphalt according to an embodiment of the present invention (FR-E mixtures) are fair superior at resisting crack propagation when compared to the FR Control 325F mixture. Both FR-E mixtures achieved almost identical performance in the overlay tester. And the fatigue life of the FR-E samples was approximately 2.5 times greater than the FR Control 325F samples. As shown in FIG. 5, the bituminous asphalt mix according some embodiments of the present invention has a fatigue life of at least 1300 cycles when measured according to TxDOT TEX-248F test specifications. Again, this shows the ability of Evotherm® M1 to increase an asphalt's resistance to cracking, while simultaneously allowing the asphalt be mixed and compacted at lower temperatures.

Resistance to Moisture-Induced Damage (Hamburg Wheel Tracking)

Wet Hamburg Wheel Track tests were conducted in accordance with AASHTO T324, "Hamburg Wheel-Track Testing of Compacted Hot Mix Asphalt (HMA)." Test samples were tested at a water test temperature of 50° C. and under a 158 lb. steel wheel load. The test specimens were loaded at a rate of 52 passes per minute after a minimum soak/conditioning time of 30 minutes at 50° C. Two indices were used to compare the different mixtures/parameters; 1)

number of cycles to result in 12.5 mm of rutting; and 2) number of cycles to result in a Stripping Inflection Point (SIP). The SIP is determined by the intersection of the primary and secondary rutting slopes that occur when plotting the Hamburg rutting vs. loading cycles. It should be noted that the SIP is generally used as an indication, or comparison, of moisture damage resistance. Meanwhile, the number of cycles to 12.5 mm of rutting is utilized to compare both the rutting resistance of the asphalt mixtures, as well as the general moisture damage resistance.

The Wet Hamburg Wheel Track test results showed little to no damage accumulated in any of the test specimens. Overall, no Stripping Inflection Point was observed in any of the mixtures with rutting at 20,000 cycles as follows: For FR Control 325F: rutting at 20,000 cycles=1.5 mm. For FR-E 325F: rutting at 20,000 cycles=1.51 mm. For FR-E 285F: rutting at 20,000 cycles=1.19 mm. The test results indicate that all three mixtures performed very similar to one another and are highly resistant to moisture damage.

Fuel Resistance

Compacted test samples were also evaluated for resistance to corrosion in the present of a fuel using the test procedure noted in FAA P-601, Section 3.3. In this procedure, kerosene is used as the "fuel" medium. Compacted samples were placed in the kerosene for 24 hours, towel dried, and then air dried for an additional 24 hours. The mass loss during this procedure is recorded as the difference in specimen mass before and after submersion.

Results of the Fuel Resistance testing are shown in Table 5. The test results show that the addition of the Evotherm® M-1 to the fuel-resistant asphalt binder results in better cohesion and a reduction in mass loss. Both the FR-E mixtures met the P-601 requirement of <2.5% mass loss, while the FR Control mixture without Evotherm® M-1 was not able to meet the maximum requirement. Table 5 shows that Evotherm® M-1 allows a liquid asphalt binder including SBS and EVA to resist corrosion in the presence of a fuel medium. Surprisingly, the FR Control 325F samples were found to have over 3 times the amount of mass loss when compared to the FR-E samples. This indicates that the addition of the Evotherm® M-1 enhances the bonding characteristics of the aggregate and asphalt binder when the aggregate is mixed with a fuel-resistant liquid asphalt binder according to an embodiment of the present invention.

Some embodiments relate to a fuel-resistant bituminous asphalt mix made using a fuel-resistant asphalt binder including a composition of fatty amine derivatives. In some embodiments, the fuel-resistant bituminous asphalt mix includes a fuel-resistant liquid asphalt binder, air voids, and an aggregate. In some embodiments the bituminous asphalt mix includes a fuel-resistant liquid asphalt binder including 89.3 wt % to 95.6 wt % liquid asphalt binder base, 2 wt % to 5 wt % styrene-butadiene-styrene, 2 wt % to 5 wt % high acetate content ethyl vinyl acetate, and 0.4 wt % to 0.7 wt % of a composition of fatty amine derivatives. In some embodiments, the fuel-resistant liquid asphalt binder has a concentration of 4 wt % to 9 wt % in the bituminous asphalt mix. In some embodiments, the air voids have a concentration in the range of 2 vol % to 3 vol % in the bituminous asphalt mix, after compaction.

In some embodiments, the bituminous asphalt mix has a weight loss by fuel immersion of less than 2.5% when measured according to FAA P-601 test specifications. As shown in Table 5 above, the addition of Evotherm® M1 into a liquid asphalt binder having SBS and EVA results in significantly less weight loss from corrosion due to fuel.

Some embodiments relate to a method of making a fuel-resistant liquid asphalt binder including mixing a liquid asphalt binder base and styrene-butadiene-styrene (SBS) in a high shear mixer to form a first mixture. In some embodiments, the liquid asphalt binder base and the SBS is mixed in a high shear mixture at a temperature between 375° F. and 425° F. After forming the first mixture, a cross-linking agent may be added to the first mixture. Then the first mixture may be cured using for example, heat and agitation. In some embodiments, the first mixture may be cured at a temperature between 360° F. and 400° F. while being agitated using a paddle mixer. In some embodiments, the first mixture may be cured over the span of 1½ days. In some embodiments, the first mixture may be cured over the span of 2 days. After curing the first mixture, a high acetate content ethyl vinyl acetate (EVA) may be mixed with first mixture in a high shear mixer to form a second mixture. In some embodiments, the first mixture and the EVA may be mixed in a high shear mixer at a temperature between 360° F. and 400° F. Then a composition of fatty amine derivatives may be mixed with the second mixture, thereby forming a fuel-resistant liquid asphalt binder. In some embodiments, the second

TABLE 5

Fuel Resistance Test Results

| Sample ID | Sample Air Voids (%) | Dry Weight (g) | SSD Weight (g) | Wt. After 24 Hr Soaking & 24 Hr Air Dry (g) | Mass Loss (%) |
|---|---|---|---|---|---|
| FR Control | | | | | |
| #1 | 3.1 | 3080.9 | 3101.5 | 2990.6 | 3.58 |
| #2 | 3.0 | 3082.1 | 3096.4 | 2965 | 4.24 |
| #3 | 3.1 | 3079.5 | 3091.2 | 2944.7 | 4.74 |
| Average | 3.1 | | | | 4.19 |
| FR-E @ 325F | | | | | |
| #1 | 2.8 | 3108.5 | 3115.9 | 3086.9 | 0.93 |
| #2 | 2.6 | 3111.6 | 3121.4 | 3070.3 | 1.64 |
| #3 | 3.1 | 3056.9 | 3072.3 | 3053.3 | 0.62 |
| Average | 2.8 | | | | 1.06 |
| FR-E @ 285F | | | | | |
| #1 | 3.1 | 3058.4 | 3074.8 | 3034.5 | 1.31 |
| #2 | 3.0 | 3061.5 | 3077.5 | 3031.3 | 1.50 |
| #3 | 3.3 | 3057.9 | 3075.3 | 3043.5 | 1.03 |
| Average | 3.1 | | | | 1.28 | mixture may be stored in a tank at a temperature between 350° F. and 360° F. before the composition of fatty amine derivatives is added.

The resulting fuel-resistant liquid asphalt binder may be composed of 89.3 wt % to 95.6 wt % liquid asphalt binder base, 2 wt % to 5 wt % styrene-butadiene-styrene, 2 wt % to 5 wt % high acetate content ethyl vinyl acetate, and 0.4 wt % to 0.7 wt % of a composition of fatty amine derivatives. In some embodiments, the styrene-butadiene-styrene has a concentration in the range of 3 wt % to 4 wt % in the fuel-resistant liquid asphalt binder. In some embodiments, the high acetate content ethyl vinyl acetate has a concentration in the range of 3 wt % to 4 wt % in the fuel-resistant liquid asphalt binder. In some embodiments, the composition of fatty amine derivatives has a concentration in the range of 0.45 wt % to 0.55 wt % in the fuel-resistant liquid asphalt binder.

In some embodiments, the resulting fuel-resistant liquid asphalt binder may be mixed with an aggregate to form a bituminous asphalt mix, which can be laid and compacted to form an asphalt surface (e.g., a tarmac, a landing strip, a highway, a parking lot, etc.). While mixing the aggregate with the fuel-resistant liquid asphalt binder, air voids may be introduced into the bituminous asphalt mix. In some embodiments, the fuel-resistant liquid asphalt binder has a concentration of 4 wt % to 9 wt % in the bituminous asphalt mix. In some embodiments, the fuel-resistant liquid asphalt binder has a concentration of 6 wt % to 8 wt % in the bituminous asphalt mix. In some embodiments the air voids may have a concentration of less than 4 vol % in the bituminous asphalt mixture, after compaction. In some embodiments, the air voids have a concentration in the range of 2 vol % to 3 vol % in the bituminous asphalt mix, after compaction. In some embodiments, the bituminous asphalt mix has a vertical strain of no more than 1.75 measured in accordance with AASHTO TP79 test specifications. In some embodiments, the bituminous asphalt mix has a fatigue life of at least 1300 cycles when measured according to TxDOT TEX-248F test specifications.

In some embodiments, the fuel-resistant liquid asphalt binder may be mixed with the aggregate at a temperature between 330° F. and 280° F. In some embodiments, the fuel-resistant liquid asphalt binder may be mixed with the aggregate at a temperature between 300° F. and 320° F. In some embodiments, the fuel-resistant liquid asphalt binder may be mixed with the aggregate at a temperature between 280° F. and 290° F. In some embodiments, the fuel-resistant liquid asphalt binder to be mixed with aggregate at 285° F. In some embodiments, the bituminous asphalt mix may be compacted at a temperature between 320° F. and 300° F. In some embodiments, the bituminous asphalt mix may be compacted at a temperature between 275° F. and 285° F.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A fuel-resistant liquid asphalt binder comprising:
   a liquid asphalt binder base having a concentration in the range of 89.3 wt % to 95.6 wt %;
   styrene-butadiene-styrene having a concentration in the range of 2 wt % to 5 wt %;
   high acetate content ethylene vinyl acetate having a concentration in the range of 2 wt % to 5 wt %; and
   a composition of fatty amine derivatives having a concentration in the range of 0.4 wt % to 0.7 wt %.

2. The fuel-resistant liquid asphalt binder of claim 1, wherein the styrene-butadiene-styrene has a concentration in the range of 3 wt % to 4 wt %.

3. The fuel-resistant liquid asphalt binder of claim 1, wherein the high acetate content ethylene vinyl acetate has a concentration in the range of 3 wt % to 4 wt %.

4. The fuel-resistant liquid asphalt binder of claim 1, wherein the composition of fatty amine derivatives has a concentration in the range of 0.45 wt % to 0.55 wt %.

5. The fuel-resistant liquid asphalt binder of claim 1, wherein the fuel-resistant liquid asphalt binder has an ASTMD7173 maximum temperature difference of less than or equal to 40° F. when using a ASTM D36 Ring and Ball apparatus.

6. The fuel-resistant liquid asphalt binder of claim 1, wherein the fuel-resistant liquid asphalt binder has a minimum performance grade of PG 82-22.

7. The fuel-resistant liquid asphalt binder of claim 1, wherein the fuel-resistant liquid asphalt binder has an ASTM D6084 elastic recovery at 25° C. of greater than or equal to 85%.

8. A bituminous asphalt mix comprising:
   a fuel-resistant liquid asphalt binder comprising:
      a liquid asphalt binder base having a concentration in the range of 89.3 wt % to 95.6 wt %;

styrene-butadiene-styrene having a concentration in the range of 2 wt % to 5 wt %;

high acetate content ethylene vinyl acetate having a concentration in the range of 2 wt % to 5 wt %; and a composition of fatty amine derivatives having a concentration in the range of 0.4 wt % to 0.7 wt %, air voids; and an aggregate.

9. The bituminous asphalt mix of claim 8, wherein the fuel-resistant liquid asphalt binder has a concentration in the range of 4 wt % to 9 wt %.

10. The bituminous asphalt mix of claim 8, wherein the air voids have a concentration in the range of 2 vol % to 3 vol %.

11. The bituminous asphalt mix of claim 8, wherein the mix has a weight loss by fuel immersion of less than 2.5% when measured according to FAA P-601 test specifications.

12. A method of making a fuel-resistant liquid asphalt binder, the method comprising:

mixing a liquid asphalt binder base and styrene-butadiene-styrene in a high shear mixer, thereby forming a first mixture;

adding at least one cross-linking agent to the first mixture;

curing the first mixture;

mixing the first mixture with high acetate content ethylene vinyl acetate in a high shear mixer; thereby forming a second mixture; and mixing a composition of fatty amine derivatives with the second mixture, thereby forming the fuel-resistant liquid asphalt binder;

wherein the liquid asphalt binder base has a concentration in the range of 89.3 wt % to 95.6 wt % in the fuel-resistant liquid asphalt binder; the styrene-butadiene-styrene has a concentration in the range of 2 wt % to 5 wt % in the fuel-resistant liquid asphalt binder; the high acetate content ethylene vinyl acetate has a concentration in the range of 2 wt % to 5 wt % in the fuel-resistant liquid asphalt binder; and the composition of fatty amine derivatives has a concentration in the range of 0.4 wt % to 0.7 wt % in the fuel-resistant liquid asphalt binder.

13. The method of claim 12, wherein the styrene-butadiene-styrene has a concentration in the range of 3 wt % to 4 wt % in the fuel-resistant liquid asphalt binder.

14. The method of claim 12, wherein the high acetate content ethylene vinyl acetate has a concentration in the range of 3 wt % to 4 wt % in the fuel-resistant liquid asphalt binder.

15. The method of claim 12, wherein the composition of fatty amine derivatives has a concentration in the range of 0.45 wt % to 0.55 wt % in the fuel-resistant liquid asphalt binder.

16. The fuel-resistant liquid asphalt binder of claim 1, wherein the fuel-resistant liquid asphalt binder has an ASTMD7173 maximum temperature difference of less than or equal to 40° F. when using a ASTM D36 Ring and Ball apparatus, wherein the fuel-resistant liquid asphalt binder has a minimum performance grade of PG 82-22, and wherein the fuel-resistant liquid asphalt binder has an ASTM D6084 elastic recovery at 25° C. of greater than or equal to 85%.

\* \* \* \* \*